Figure 2:
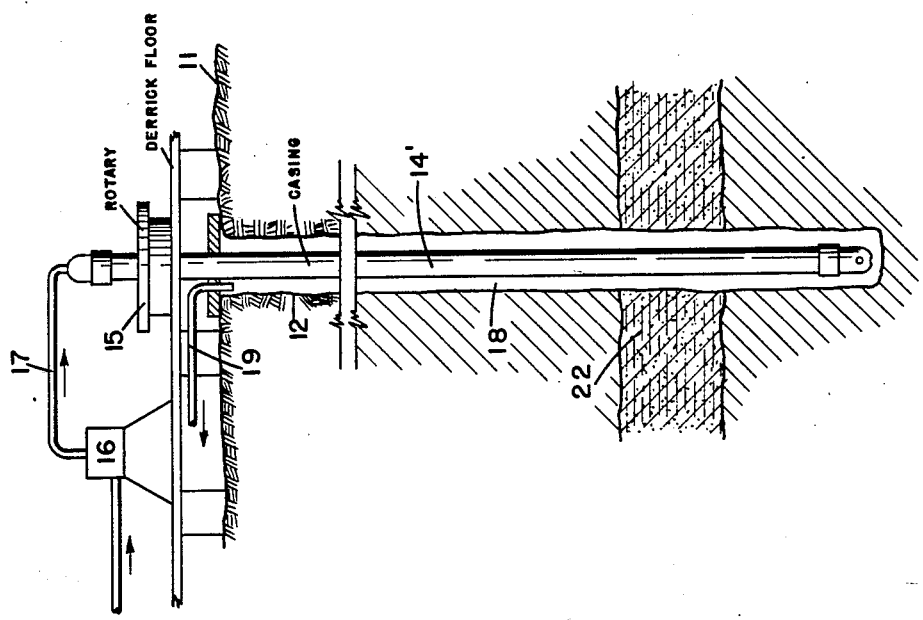

April 17, 1951    B. E. MORGAN ET AL    2,549,507

OIL WELL CEMENTING

Filed Dec. 13, 1947

Bryan E. Morgan
Richard A. Salathiel, INVENTORS

BY

ATTORNEY.

Patented Apr. 17, 1951

2,549,507

UNITED STATES PATENT OFFICE 2,549,507

OIL WELL CEMENTING

Bryan E. Morgan and Richard A. Salathiel, Houston, Tex., assignors, by mesne assignments, to Standard Oil Development Company, Elizabeth, N. J., a corporation of Delaware Application December 13, 1947, Serial No. 791,630

3 Claims. (Cl. 166—22)

This invention relates to improvements in cementing and in cementing operations. More particularly, it relates to an improved cementing composition for use in boreholes drilled for the production of fluids, particularly oil and gas, and an improved method of cementing such boreholes.

In drilling boreholes into subsurface formations for the production of fluids therefrom, cementing operations are normally resorted to before the well is finally completed and allowed to produce. The conditions under which such operations must be conducted are distinctively different from the conditions which ordinarily prevail when cement is used for other purposes, for example, in building construction. In building construction, the cement is usually poured into place as a very thick paste; whereas, in oil well cementing the cement must be sufficiently fluid to be pumped into place. Furthermore, aggregate materials, such as oyster shells, gravel, and sand are usually mixed in with the cement paste, whereas these materials are seldom, if ever, used in oil well cementing. In building construction the cement slurry, when put in place, is usually permitted to set and harden at atmospheric temperatures and pressures. On the other hand, in conducting cementing operations in boreholes drilled into subsurface formations, the cement slurry must be such as will set and harden when submerged in water. Superatmospheric temperatures and pressures must also be contended with, fluid pressures of several thousand pounds per square inch being common. Temperatures increase with increased depth of the hole and temperatures as high as 300° F. are known.

One type of cementing operation commonly conducted consists of cementing in place the steel casing used for lining the borehole walls. In carrying out this operation, after steel casing of the desired diameter has been run into the borehole, cementing material is introduced into the casing and forced around the lower end thereof into the annular space between the casing and the walls of the borehole. In this manner, the steel casing is firmly affixed to the surrounding earth formation thereby preventing the passage of fluids around the outside of the casing. Another type of cementing operation is sometimes resorted to when it is desired to plug a porous formation adjacent the borehole through which drilling fluid is being lost. The object of this latter type of operation is to prevent further loss of drilling mud, sometimes referred to as "loss of returns."

Loss of drilling fluids during drilling operations is objectionable for a number of reasons. It sometimes happens that the porous formation adjacent the borehole is of sufficient porosity to permit the escape of all the drilling fluid from the borehole. It may even happen that channels in the porous formation connect with caverns of tremendous cubic capacity. When such a condition prevails, no part of the drilling fluid pumped into the borehole returns to the surface. Besides the inconveniences and expense of the loss of the drilling fluid, a still more serious result of the loss of circulation is the greatly enhanced possibility of a blow-out or of a cave-in of the borehole, a circumstance which may necessitate abandonment of further drilling operations. In plugging such a formation, cementing materials are pumped from the surface into the borehole in a sufficient amount to plug the porous formation or to fill the channels. After the slurry has been allowed to set, further drilling operations are again resumed.

In conducting cementing operations in boreholes drilled for the production of fluids from subsurface formations, there are three well recognized types of cement which are normally employed. The first of these, and probably most extensively employed, is Portland cement. Although the individual components in Portland cement vary somewhat with source of raw materials and method of manufacture, the term is used in the cement industry to indicate the type of cement ordinarily used in construction work. In addition to the ordinary construction grade of Portland cement, modified Portland cement designated as high-early-strength cement and slow-setting cement are sometimes used in cementing operations in connection with the drilling of boreholes into subsurface formations. Whatever type of cement is selected for accomplishing cementing operations, the cement is admixed with water to form a slurry, the percentage of cement in the slurry being determined by the properties desired in the slurry. In addition to cement and water, other materials are sometimes added for the purpose of amending the properties of the slurry. For example, it is known to add clay. It is also known to add iron oxide to the slurry. Furthermore, dispersing agents, such as polymerized sodium salts of substituted benzoic alkyl sulfonic acids, polymerized sodium salts of alkyl naphthylene sulfonic acids, soluble calcium lignin sulfonate, sodium lignin sulfonate, etc., are sometimes used. These added materials affect the viscosity, setting time, tensile strength and other characteristics of the slurry or the resulting hardened cement mass. However, one of the chief disadvantages of aqueous cement slurries, whether made by using construction type, high-early-strength type or slow-setting type of Portland cements, with or without any of the above-mentioned amendatory agents added thereto, is that such slurries rapidly lose water by filtration.

Rapid loss of water by filtration from cement slurries used in cementing operations conducted when drilling into subsurface formations is not only disadvantageous but may sometimes prove disastrous. For example, when setting casing, cement slurry is pumped through the casing, around its lower edge, and into the annular space between the casing and the borehole walls. In this type of operation, it is necessary substantially to fill the annular space so that the casing may have sufficient strength to resist the tremendous pressure to which it will be later subjected when oil or gas is produced from the producing stratum. Slurries made from any of the above mentioned cementing materials, despite their tendency to lose water rapidly, may be entirely satisfactory when the formations adjacent the casing are substantially impervious since the slurry pumped into the casing and the hardened mass resulting therefrom will substantially fill the annular space between the casing and the borehole wall. However, serious difficulties are encountered when one or more of the formations adjacent the casing are pervious to the passage of fluid. When this condition exists, water from the cement slurry filters from the slurry into the pervious formation and the partially dried cement tends to accumulate at the point or points on the borehole walls at which water is thus filtering. Since this partially dried cement slurry, although it tends to build up a cake on the impervious formation, does not prevent or hinder filtration of water therethrough, any slurry flowing by such point or points continues to lose water and more and more partially dried cement slurry tends to accumulate. Consequently, if an impervious formation is encountered between the lower end of the casing and the earth's surface, the above referred to cement cake may build up to such an extent as to prevent further passage of slurry past this point and a faulty cementing job results. This leaves a large quantity of cement slurry inside the casing which cannot be reversed out and usually must be allowed to set. Considerable time and expense is involved in drilling out this set cement. Furthermore, in order to fill the annular space above this unwanted cement plug, various expedients must be resorted to including that of piercing the casing above the cement plug and then pumping cement through the holes so pierced. Such expedients are time-consuming, expensive and otherwise unattractive.

Even before casing is run into the borehole, it may be necessary to plug a porous formation penetrated by the borehole. Although slurries made from any of the previously mentioned types of cements have been used for plugging porous formations surrounding the boreholes, large quantities of slurry have often been used before successful plugging has been accomplished. This has been particularly true where the porous formation contains channels leading to cavities of very large or unlimited expanse, since in using such slurries, it is very difficult and sometimes impossible to plug these channels with sufficient rapidity to prevent large losses of the slurry because of the high fluidity of such slurries.

It is an object of our invention to provide an aqueous cementing composition which has little or no tendency to lose water by filtration. It is a further object of our invention to provide a cementing material the fluidity of which will decrease on heating. It is a further object of our invention to provide a method for cementing casing and for plugging porous formations adjacent the borehole.

In carrying out our invention, methyl cellulose is added to a slurry consisting of water and cement. In the practice of our invention, methyl cellulose may also be added to cement slurries containing water, cement, and added materials such as iron oxide, clay or dispersing agents. By the addition of methyl cellulose in suitable amounts to any of the above mentioned slurries, the loss of water therefrom by filtration is greatly reduced and, furthermore, the slurry will gel when heated.

Methyl cellulose employed in accordance with our invention may be prepared by methylating cellulose. The properties of the resulting methyl cellulose will depend upon a number of factors among which are (1) the source of raw cellulose, (2) the temperature and time of contact of the cellulose with and the concentration of the caustic alkali solution used to prepare the cellulose material for methylation and (3) the degree to which the cellulose is methylated. Methylation of the treated cellulose may be accomplished in various ways and one well-known method consists of contacting caustic treated cellulose with methyl chloride thereby substituting a methyl group for a hydrogen atom attached to the cellulose molecule. It has been postulated that reaction occurs in the following manner

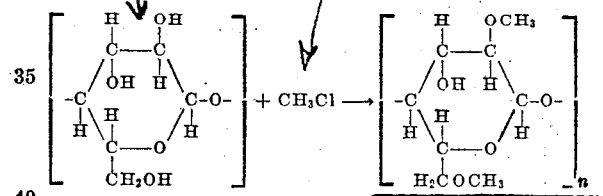

In view of the complexity of cellulose itself and of the various reactions which might conceivably take place during methylation, it will be appreciated that the ordinary physical tests usually applied to identify chemical compounds cannot readily be applied to methyl cellulose. However, the character of the resulting methylated molecule may be indicated by the viscosity of an aqueous solution in which the methyl cellulose has been dissolved. Thus, when 2 gram samples of methyl cellulose prepared by different procedures are dissolved in 98 grams of water, the viscosity of the resulting solutions will vary over a wide range. For example, a methyl cellulose may be prepared such that when 2 grams are dissolved in 98 grams of distilled water, the resulting solution will have a viscosity at 20° C. of 15 centipoises. It is also possible to prepare a methyl cellulose such that when 2 grams are dissolved in 98 grams of distilled water, the resulting solution will have a viscosity at 20° C. of 4000 centipoises. Methyl cellulose of intermediate viscosities may also be prepared.

In the practice of our invention, we have found that methyl cellulose compositions which produce 2% aqueous solutions varying in viscosity at 20° C. from 15 to 4000 centipoises are effective in reducing the filtration rate of cement slurries and are also effective in causing the cement slurry to gel on heating. However, we find that a methyl cellulose whose 2% aqueous solution has a viscosity at 20° C. of about 100 centipoises is ordinarily more effective over the wide range of dilutions occurring in cement slurries than are the methyl celluloses whose 2% aqueous solutions have substantially lower or substantially higher viscosity. As little as .05% and as much as 5% methyl cellulose, based on the water content of the slurry, may be used with effective results. An amount larger than 5% methyl cellulose will generally impart an extremely high viscosity to the cement slurry making the slurry very difficult, and in some cases impossible, to pump. On the other hand an amount less than .05% does not appreciably decrease the filtration rate and does not impart the property of gelation upon heating.

In one series of tests involving the cementing composition of our invention various quantities of methyl cellulose were added to cement slurries consisting of a Portland cement and water. The tendency of the slurries so prepared to lose water was then determined by using the standard A. P. I. low pressure wall building mud tester. In determining the filtration rate by the use of the above wall building mud tester, 600 grams of dry cement were admixed with the quantity of water necessary to prepare a slurry of the desired water-to-cement ratio. Various amounts of methyl cellulose (a 2% solution of said methyl cellulose having a viscosity at 20° C. of 100 centipoises) were admixed with the slurry. The resulting admixture was transferred to the filter press of the mud tester and the slurry layer was covered by a water layer. A pressure of 50 pounds per square inch was then exerted on the water column and the volume of filtrate passing through the filter was observed at the end of three minutes. All tests were conducted at room temperature, approximately 80° F. The results of these tests are indicated in the following table:

*Table I*

| Methyl Cellulose Added—Wt. Per Cent of Final Mix | Water-to-Cement Ratio of Cement Slurry, Gal./Sack | R. P. M. at 400 g. Stormer | Vol. of Filtrate, cc. 3 Min. at 50 lb. Press. |
|---|---|---|---|
| 0 | 5 | 1,000 | 113 |
| 0.2 | 6 | 770 | 34 |
| 0.2 | 7 | 860 | 41 |
| 0.5 | 7 | 490 | 8 |
| 0.2 | 8 | 1,250 | 74 |
| 0.5 | 8 | 670 | 7 |
| 0.5 | 10 | 970 | 16 |
| 1.0 | 10 | 230 | 2 |
| 1.0 | 12 | 540 | 1 |
| 1.0 | 14 | 750 | 2 |

For purposes of finding the effect of varying the water-to-cement ratio on consistency and filtration rates, the data appearing in Table II below were secured. However, in securing these data, the cement employed in making the slurry, although a Portland cement, was not taken from the same batch of Portland cement employed in securing the data appearing in Table I above. Consequently, although the data appearing in Tables I and II are not directly comparable, approximate comparisons may be made.

*Table II*

| Water-to-Cement Ratio | R. P. M. at 400 g. Stormer | Vol. of Filtrate, cc. 3 Min. at 50 lb. Press. |
|---|---|---|
| 5 | 680 | 141 |
| 6 | 1,070 | 170 |
| 7 | 1,500 | 200 |

It will be observed from the above tables that as the water-to-cement ratios of the slurries containing only water and cement increases the viscosity of the slurry decreases and the filtration rate increases. It will also be further observed that by the addition of small quantities of methyl celluose to the cement slurry the filtration rate of the slurry so treated is greatly reduced.

In another series of tests illustrative of our invention, methyl cellulose was added to a slurry consisting of water, Portland cement and several different additives, such as iron oxide, clay, and a dispersing agent. In determining the filtration rates of these cementing compositions, the standard A. P. I. low pressure wall-building mud tester was employed. Again 600 grams of dry Portland cement were mixed with the quantity of water necessary to prepare a slurry of the desired water-to-cement ratio and to this mixture methyl cellulose and the previously mentioned materials were added. Each of these mixtures were then transferred to the filter press of the mud tester and water was added above the slurry layer. A pressure of 100 pounds per square inch was exerted on the water column and the volume of filtrate observed at the end of 30 minutes. All tests were conducted at room temperature, approximately 80° F. The results of these tests are indicated in the following table:

*Table III*

| Material Added to Portland Cement Slurry | Wt. per cent of Material Added Based on Final Mix | Water-to-Cement Ratio, Gal./94 lbs. | Water-to-solids Ratio, Gal./94 lbs. | R. P. M. at 400 gm. Stormer | Volume of filtrate, cc. in 30 min. at 100 lbs./sq. in. press |
|---|---|---|---|---|---|
| None | | 5 | 5 | 1,000 | (1) |
| Methyl Cellulose | 0.5 | 7 | 7 | 500 | 50 |
| Do | 0.5 | | | | |
| Polymerized sodium salts of substituted benzoic alkyl sulfuric acids | 0.2 | 7 | 7 | 570 | 28 |
| Methyl Cellulose | 0.5 | | | | |
| Fe₂O₃ | 10.0 | 9.3 | 7 | 230 | 21 |
| Clay | 5.0 | | | | |
| Methyl Cellulose | 0.5 | | | | |
| Fe₂O₃ | 10.0 | | | | |
| Clay | 5.0 | 9.3 | 7 | 480 | 10 |
| Polymerized sodium salts of substituted benzoic alkyl sulfuric acids | 0.2 | | | | |

¹ All water filtered from slurry before elapse of 30 minutes. Filtration rate: 113 cc. in 3 min. at 50 lbs./sq. in.

It will be obvious from the above table that the loss of water by filtration from slurries containing cement and other extraneous materials, such as iron oxide, clay and dispersing agents may be greatly reduced by the incorporation of small amounts of methyl cellulose therein.

The cementing composition of our invention is also particularly valuable for use in plugging porous formations penetrated by a borehole. As previously mentioned, the temperature in such formations normally exceed atmospheric temperature and are known to be as high as 300° F. Cementing compositions heretofore used for plugging such formations do not acquire a rapid initial set and consequently tremendous quantities of cementing material are often used before the porous formation is adequately sealed. On the other hand, by admixing methyl cellulose with the aqueous mixture containing any of the cements of the afore-mentioned type, the property of gelling on heating is imparted thereto. The temperature of gelation of the resulting admixture may be controlled to suit the temperature conditions existing in the formation to be plugged by incorporating the proper quantity of methyl cellulose in the aqueous mixture. The temperature of gelation may be further controlled to some degree by selecting a methyl cellulose of the proper degree of methylation.

The effect on gelling characteristics of adding specific amounts of methyl cellulose to a cement slurry and the effect of adding different methyl cellulose compositions which had been processed to different viscosity grades was determined by conducting a series of experiments wherein varying amounts of two samples of methyl cellulose was added to different samples of a slurry consisting of water and Portland cement, the water-to-cement weight ratio of the slurry in each case being 8 gallons per sack. Each sample was placed in a laboratory test tube which was then immersed in a water bath. The temperature of the water bath was gradually increased and the test tube was removed from the bath at periodic intervals and inverted. If the slurry flowed on inversion of the tube, the test tube was again immersed in the water bath. This procedure was repeated until the sample ceased to flow when the test tube was inverted. The temperature at which the cement ceased to flow was recorded as the gelation temperature of the cement slurry. The data secured are shown below in Table IV.

*Table IV*

| Methyl Cellulose Added | | | Water-to-Cement Ratio of Slurry | Gelation Temperature, °F. |
|---|---|---|---|---|
| Viscosity Type | Wt. Per Cent Based upon | | | |
| | Total Slurry | Water | Cement | | |
| 25 | 0.41 | 1.0 | 0.71 | 8 | 140 |
| 25 | 1.22 | 3.0 | 2.13 | 8 | 130 |
| 25 | 2.04 | 5.0 | 3.55 | 8 | 120 |
| 4,000 | 0.21 | 0.5 | 0.36 | 8 | 130 |
| 4,000 | 0.41 | 1.0 | 0.71 | 8 | 125 |
| 4,000 | 0.82 | 2.0 | 1.42 | 8 | 122 |

It will be noted that as the percentage of methyl cellulose (a 2% solution of said methyl cellulose having a viscosity at 20° C. of 25 centipoises) is increased from 1% to 5%, based upon the water content of the slurry, the gelation temperature decreases from approximately 140° F. to approximately 120° F. It will be further noted that when the amount of methyl cellulose (a 2% solution of said methyl cellulose solution having a viscosity at 20° C. of 4,000 centipoises) was increased from .5% to 2%, the gelation temperature decreased from 130° F. to approximately 122° F. It will also be noted that, when added in the same amount, the sample of methyl cellulose which produced the more viscous solution was somewhat more effective in reducing the gelation temperature of the cement. It will be understood, of course, that the above data is included by way of illustration and not by limitation.

Figure 1:
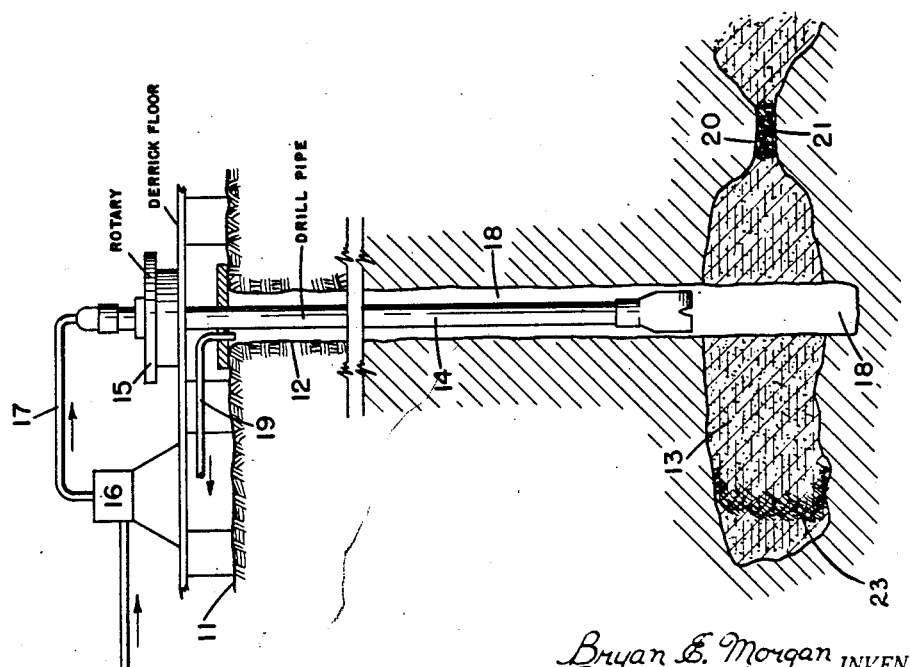

Referring now to Fig. 1 the use of a cement composition containing methyl cellulose in cementing off a porous subsurface formation traversed by a borehole is illustrated in which reference numeral 11 designates the surface of the earth, 12 designates the wall of a borehole which traverses a porous formation 13, a drill pipe 14 is supported in the borehole by means of rotary table 15. During drilling operations, drilling fluid is forced by means of pump 16 through line 17 through drill pipe 14 into the borehole where it passes upwardly through the annular space 18 between drill pipe 14 and borehole walls 12 then out through line 19. When it is desired to plug porous formation 13, the cement composition of our invention is pumped through line 17 by pump 16 into the drill pipe 14 where it displaces drilling fluid and begins to fill the channels and pores of porous formation adjacent the borehole. Outlet line 19 is ordinarily closed and cement is forced radially into channels 20 by continued force applied by means of pump 16. As the slurry is forced into porous formation 13 and channels 20, the slurry is heated by the heat available in the formation. When the slurry has been heated to its gelation temperature, it will acquire an initial strength thereby forming an effective plug in the formation, as indicated by shaded areas 21 and 23, against further passage of slurry.

Referring to Fig. 2 which illustrates the cementing off of a well casing. Before cementing off the well casing, the casing ordinarily contains drilling mud and the annular space 18 between casing 14' and the walls 12 of the borehole also normally contain drilling mud. When it is desired to cement off the casing, the cement composition of our invention is forced by a pump 16 through line 17 into casing 14', displacing the drilling mud. The drilling mud originally present in casing 14' is forced around the lower edge of casing 14' through annular space 18 and out of the hole through line 19. The cement slurry follows the path of the drilling mud and consequently passes around the lower edge of casing 14' and upwardly through annular space 18 until the annular space has been filled with cement slurry. Just enough cement slurry should be used in this operation so that when annular space 18 is filled with slurry only a small amount of cement slurry will still remain in casing 14'. This may be accomplished in several different ways as, for example, by pumping into casing 14' just sufficient slurry to fill annular space 18 and then forcing the cement slurry downwardly inside casing 14' by means of water or other fluid. After annular space 18 has been filled with cement, time is permitted for the cement slurry to harden. When the borehole surrounding casing 14' has passed through a porous formation, such as that indicated by 22, the cementing composition of this invention, is particularly valuable because of its low filtration rate. When the cementing composition of this invention is used, the slurry will flow past porous formation 22 without depositing a partially dried cake thereon and consequently will completely fill annular space 18.

While this invention has been described as applied to the cementing off of porous subsurface formations and the cementing of well casing, it will be understood that it can be used for any purpose wherein a cement slurry having a low filtration rate is required. It can, of course, also be used for any purpose in which a cement slurry which gels at temperatures above atmospheric is required.

What we claim is.

1. In the method of cementing off casing in a well which comprises pumping down through the casing and upwardly in the annular space between the casing and the borehole an aqueous inorganic cement slurry, the step of adding to the cement slurry methyl cellulose in an amount sufficient to retard loss of water from the slurry by filtration.

2. A method in accordance with claim 1 in which the methyl cellulose is introduced in amounts ranging between .05% and 5% by weight based on the amount of water in the slurry.

3. In the method of cementing a casing in a well which comprises pumping down through the casing and upwardly into the annular space between the casing and the borehole, an aqueous inorganic cement slurry, the step of adding to the cement slurry methyl cellulose in amounts ranging between 0.1% and 2.8% by weight based on the amount of water in the slurry.

BRYAN E. MORGAN.
RICHARD A. SALATHIEL.

REFERENCES CITED

The following references are of record in the file of this patent:

UNITED STATES PATENTS

| Number | Name | Date |
| --- | --- | --- |
| 2,326,577 | Teague | Aug. 10, 1943 |
| 2,427,683 | Ludwig | Sept. 23, 1947 |
| 2,432,971 | Ruthman et al. | Dec. 16, 1947 |